United States Patent [19]
Kimbell

[11] Patent Number: 5,056,140
[45] Date of Patent: Oct. 8, 1991

[54] COMMUNICATION SECURITY ACCESSING SYSTEM AND PROCESS

[76] Inventor: Blanton Kimbell, 27 Hastings Rd., Marlboro, N.J. 07746

[21] Appl. No.: 483,443

[22] Filed: Feb. 22, 1990

[51] Int. Cl.$^5$ ............................................. H04L 9/00
[52] U.S. Cl. ...................................... 380/23; 380/25; 380/46
[58] Field of Search ............................. 380/23, 25, 46

[56] References Cited

U.S. PATENT DOCUMENTS

| | | | |
|---|---|---|---|
| 4,349,695 | 9/1982 | Morgan et al. | 380/25 |
| 4,578,530 | 3/1986 | Zeidler | 380/25 |
| 4,779,224 | 10/1988 | Moseley et al. | 380/25 |
| 4,916,738 | 4/1990 | Chandra et al. | 380/25 |

Primary Examiner—Thomas H. Tarcza
Assistant Examiner—David Cain
Attorney, Agent, or Firm—Darby & Darby

[57] ABSTRACT

When the master or host computer receives an incoming call, a random number is generated that is then encrypted and sent to the remote user station that placed the initiating call. If a response is not returned from the requester within a preselected time period, the master station disconnects the incoming call. When a timely and proper response to the master stations's encrypted random number is received at the master station, the response is decrypted and compared to a stored list that identifies the authorized remote terminals. After a proper remote station identification, the connection between the host computer and the requesting remote station is maintained. An authorized remote station that initiated the call to the master computer, provides the proper response to the master computer's encrypted random number by decrypting the message to determine the random number and then transmitting its identification number to the host computer is encrypted format, using the random number as the encryption key. The mast station decrypts the response to determine the identification number of the remote station which initiated the call. The user terminal identification number and its software for decrypting messages from the host computer are maintained in volatile storage. If the user terminal is removed from its proper location and reinstalled elsewhere, the interruption of electrical power wipes out the data stored in the user terminal. When reconnected the user terminal is incapable of responding to challenges from the host computer.

5 Claims, 2 Drawing Sheets

COMMUNICATION SECURITY ACCESSING SYSTEM AND PROCESS

FIELD OF THE INVENTION

This invention relates generally to a system and process for accessing a host or master station in a computer network, and more particularly, concerns a system and process for permitting only authorized access to a network's master station.

BACKGROUND OF THE INVENTION

The problem of unauthorized access to computer system has made recent headlines and been the subject of major films. The growth of large multi-user computer systems places enormous banks of data at risk of infiltration by persons who may attempt to enter the system merely to demonstrate their computer skills or for personal gain or other advantage. Data bank infiltration can affect activities extending in a wide range, for examples, from military and government security to multi-billion dollar banking transactions, and to changing grades of children at school. Not only may unauthorized persons gain access to computer systems for obtaining and/or modifying the data available therein, but also for destroying such data. Clearly, large institutions, where the stakes are high and the data highly confidential, are reluctant to place their data into computer systems or relocate to other systems that do not include sophisticated precautionary techniques and methods to prevent unauthorized entry to the system. The degree of sophistication required in the security systems continually cranks up as each new system presents a challenge to those who make a specialty of obtaining unauthorized access to computer systems, whether for sport, advantage or profit.

The use of fixed codes and passwords to identify user terminals to the master or host computer before allowing entry into the system, has proven to be naive in the face of determined efforts to break such codes. For example, identifying codes for each user terminal must be stored in the master station's computer where it is accessible to operators, possibly acting without authority, at the master station. Where the master station is connected to user terminals by public networks such as public telephone lines, interception of the codes from the user terminals is easily accomplished. Thereafter, the intercepted code can be used from any terminal to access the master station over the public lines.

What is needed is a communication security accessing system that provides protection from unauthorized access by generating a new entry code for each attempt to access the system. Only authorized user terminals should be capable of providing proper responses to a master station's verifying requests, the required response changing with each and every attempt to access the master station.

Accordingly, it is an object of this invention to provide an improved communication security accessing system and process which reliably prevents unauthorized access to the master station of a computer system.

Another object of the invention is to provide an improved communication security accessing system and process which does not rely on invariable passwords and codes for identifying user terminals.

A further object of this invention is to provide a improved communication security accessing system and process which rejects connection to a user terminal which has been moved from its authorized location.

Another object of this invention is to provide an improved communication security accessing system that provides an accounting function, keeping records of successful and unsuccessful attempts to access the master station.

Yet another object of this invention is to provide an improved communication security accessing system that is "invisible" to the access requestor.

BRIEF DESCRIPTION OF THE INVENTION

Generally speaking, in accordance with a preferred embodiment of the invention, a security system is provided which is especially suitable for reliable rejection of access to the master station by unauthorized user terminals. When the master or host computer receives an incoming call, a random number is generated which is then encrypted and sent to the remote user station that placed the initiating call. If a response is not returned from the user at the remote or slave terminal within a preselected time period, the master station disconnects the incoming call.

However, if within the prescribed time limit, a proper response to the master station's encrypted random number is received at the master station, the response will be decrypted at the master station and compared to a stored list that identifies the authorized remote terminals. When a proper remote station identification has been made, the connection between the host computer and the requesting remote station is maintained and the remote user may access the host computer in the usual manner.

An authorized remote station that initiated the call to the master computer, provides the proper response to the master computer's encrypted random number by decrypting the message to determine the random number and then transmitting its identification number to the host computer in encrypted format, using the random number as the encryption key. The master or host station, having knowledge that a proper response must be encrypted with the master-station-generated random number as the encryption key, decrypts the response to determine the identification number of the remote station which initiated the call.

The user terminal identification number and its software for decrypting messages from the host computer or master station, are maintained in volatile storage. If the user terminal is removed from its proper location and reinstalled elsewhere, the interruption of electrical power wipes out the volatile data stored in the user terminal. When reconnected the user terminal is incapable of responding to challenges from the host computer.

For new installations of user terminals or after authorized relocation of a user terminal, the information needed for proper operation and accessing of the master station, is down-loaded from the master station to the user terminal over the connecting lines, for example, the public telephone lines, after the master station verifies that the user terminal is authorized.

The invention accordingly comprises the several steps and the relation of one or more of such steps with respect to each of the others, which will be exemplified in the method hereinafter disclosed, and the scope of the invention will be indicated in the appended claims.

BRIEF DESCRIPTION OF THE DRAWINGS

For a fuller understanding of the invention, reference is made to the following description taken in connection with the accompanying drawings, in which.

DESCRIPTION OF THE PREFERRED EMBODIMENTS

Figure 1:
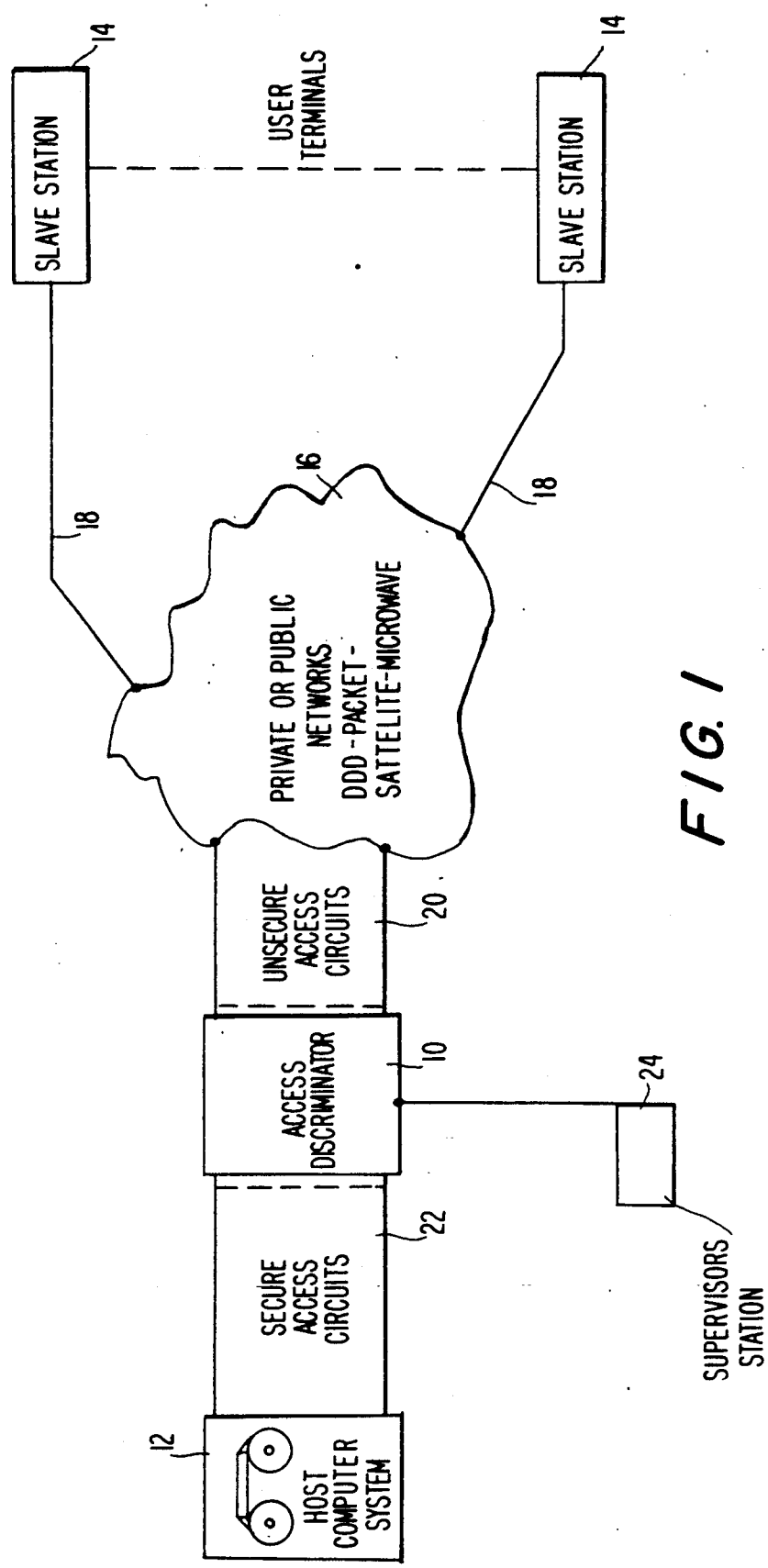
FIG. 1 is a functional block diagram of a system for using the process in accordance with the invention.

With reference to FIG. 1, an access security discriminator 10 is positioned between a host computer system 12 or central computer and a plurality of slave stations or user terminals 14. In conventional usage, the slave stations or user terminals 14 have access to the host computer system 12 by way of private or public communication networks 16 including telephone systems, satellite and microwave transmissions, for example.

As an exemplary construction, a telephone network connection 16 between the host computer system 12 and the terminals 14 will be described. Each user terminal 14 has an individual and direct connection 18 with the communication network 16. These independent lines 18 are conventional and the phone network 16 makes connections to intermediate outgoing lines which are available to the general public, as the phone company's call processing system dictates.

As described more fully hereinafter, the access security discriminator 10 challenges all calls directed towards the host computer system 12, screening out unauthorized calls and allowing authorized calls to pass to the secured access circuits 22 which connect directly to the host computer system 12. Once connected to the host computer system 12, any user terminal 14 alone, or concurrently with operations of other authorized user terminals 14, may communicate and "do business" with the host computer system.

A supervisor station 24 connects to the access security discriminator 10 for the purpose of monitoring, when desired, activities between the host computer system 12 and the user terminals 14 and for record keeping and maintenance activity between the host 12 and user terminals 14. Records are kept of every attempt, successful or not, to access the computer system 12.

It should be realized that the method can be used not only for accessing a host computer system as described herein, but also for accessing secure communication terminals, and communications networks. The call receiving devices and the originating devices may be located in the same facility or miles apart. The user/slave station may be connected to the user's terminal, computer or network.

The method by which the access security discriminator 10 discriminates between authorized and unauthorized incoming calls directed to the host computer 12, is now described.

When a user wishes to make access to the host computer, this request is accepted at the slave station, which initiates a connection process in accordance with the protocol requirements of the circuit or network that is being used as the communication's medium 16. When attempting to access the host computer 12, the slave station 14 is connected by the communication network 16 to the access security discriminator 10. The process of initiating a call and making the first connection is indicated with the reference numeral 26 in FIG. 2. When the access security discriminator 10 receives the incoming call, it generates a random number using internal software and then encrypts the random number, which may, for example, be 64 bits, and transmits the encrypted random number back over the communication network 16 to the slave station 14. The effectiveness of the security accessing system is not dependent upon the encryption algorithms which are employed. The process of receiving the incoming call, generating a random number and encrypting said number is indicated in FIG. 2 with the reference numeral 28.

The access security discriminator 10 now awaits a response from the remote terminal 14 which initiated the call. When transmitting the encrypted random number to the remote location, a timer within the security discriminator 10 commences operation. Failure to receive a response within the prescribed time period, for example, 2 seconds, causes the access security discriminator 10 to disconnect itself from the line on which the incoming call was received. This timing process and the disconnect option is indicated by the reference numeral 30 on the flow diagram of FIG. 2. A failure of a response within the prescribed time limit occurs when the call initiator is not an authorized user and is unable to provide a prompt response, proper or otherwise, within the prescribed time period.

Assuming that the initiating slave station 14 is authorized and contains within its memory suitable software, a proper response is provided as follows. The slave station 14 receives the encrypted random number from the access security discriminator 10 and, using its software, decrypts the message and extracts therefrom the random number. This is indicated by the reference numeral 32 in FIG. 2.

Figure 2:
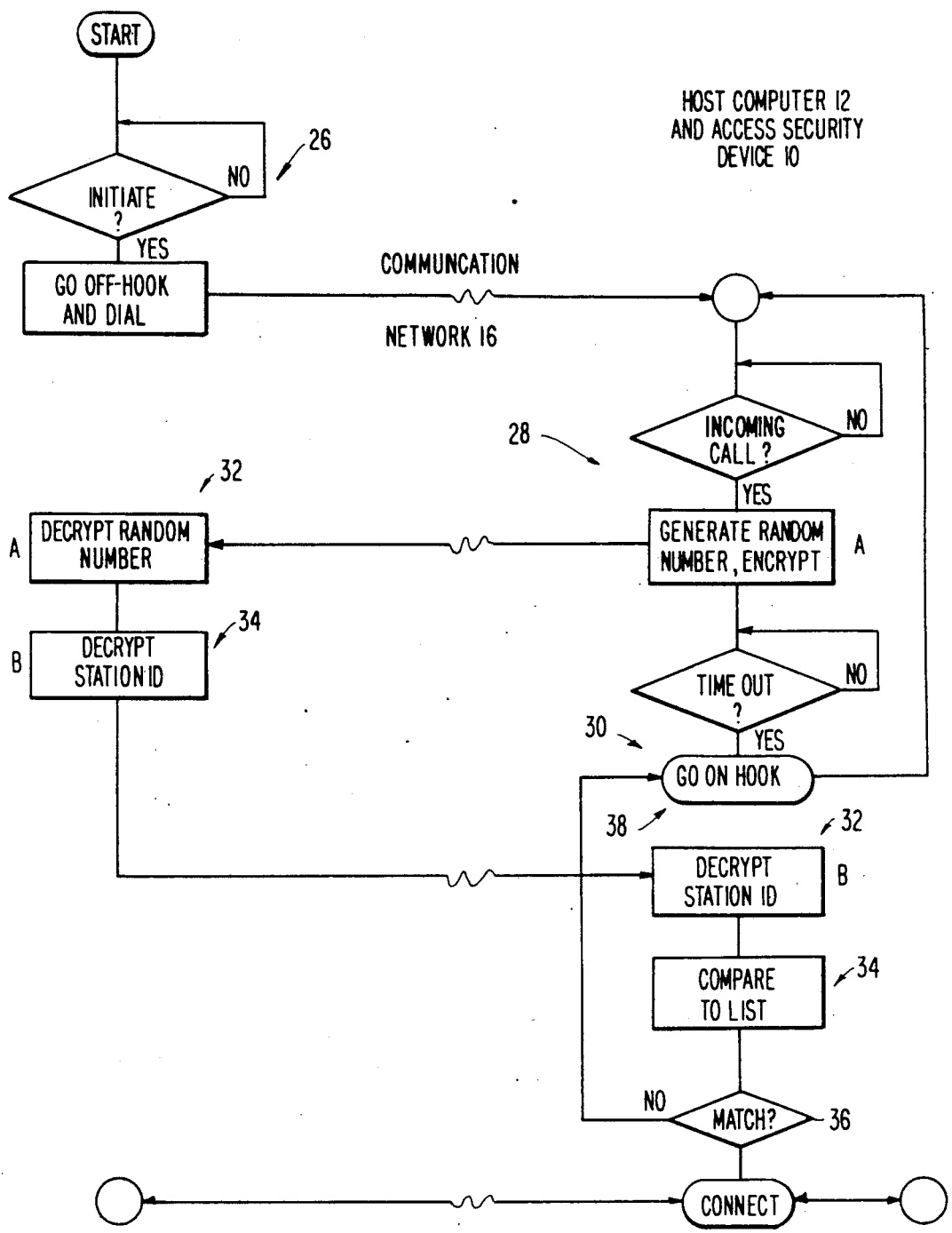
FIG. 2 is a flow diagram representing the process in accordance with the invention of accessing a master station by a user terminal.

The remote slave station 14 has an identification number in the overall computer network system and the slave station 14 then encrypts this identification number, using the random number as the encryption key (FIG. 2, reference No. 34). This encrypted identification number travels over the communication network 16 to the access security discriminator 10 located with the host computer 12, where the message is decrypted. Because the access security discriminator 10 initially generated the random number, it is able to use that number to decrypt the incoming coded number, thereby extracting the identification number of the remote station 14 (FIG. 2, reference No. 32).

In the memory of, or otherwise available to the access security discriminator 10 is stored a list of all remote station identification numbers to which the host computer 12 may be properly connected for authorized usages. The identification number from the remote station, which has been decrypted, is compared against the stored list of identification numbers. If a match is found, then a connection by way of the secured circuits 22 is made between the access security discriminator 10, and its associated host computer or network 12. The terminal 14 and host 12 are now connected.

If the decrypted identification number received from the remote location does not match an identification number on the stored list available to the access security discriminator 10, the phone connection to the remote requestor is broken. The supervisor station 24 maintains audit records of every attempt at access.

Through the access security discriminator 10, it is also possible to keep track of the authorized an unauthorized removal or shutting down of all slave stations 14.

Each slave station 14 is designed with its access security software stored in random access memory. Therefore, whenever a slave station loses power for a brief period of time, it loses the security software program which is stored in that memory. As soon as power is restored, the slave station will automatically make a connection to the access security discriminator 10 and send a software load request in code, using its identification number and user password. When the access security discriminator 10 receives this information, a process of down-line loading of a new security software program to the slave station 14 is begun with a security check.

The first step in the down-line loading process disconnects the connection made by the slave station 14 with the security discriminator 10. Then the identification and user password received from the slave station 14 are checked against memory at the host computer 12 to ascertain that the request came from an active authorized slave station 14. If the identification and user password do not pass this check, the security discriminator 10 ignores the request and sends a message of this transaction to an audit library file. On the other hand, if the identification and user password prove to be valid, the security discriminator 10 will initiate a new connection to the address listed for that slave station 14. If the slave station does not answer the connection request after a preselected number of attempts, for example, two attempts, the security discriminator 10 will cease its attempt to connect and report this event to an audit library file as a stolen or removed slave station.

Should the slave station answer the connection request from the access security discriminator 10, the discriminator 10 will begin a down-line load sequence by asking the slave station for its ID and user password. The access security discriminator 10 compares this information with the identification and user password that were sent with the initial request for a software down-line load, and also makes comparison with the authorized list of identifications and user passwords stored in memory.

Once a match is confirmed, the access security discriminator 10 begins the down-line load transfer of the access security software program for that slave station. When the down-line load is completed, the security discriminator 10 can disconnect the connection and a record of the event is sent to the audit library file.

At this point in the procedure, the slave station 14 which has received the software inputs initiates a conventional access security connection to the master station via the access security discriminator 10 in order to test its stored software. If the access security connection is successful, the access security discriminator 10 records this event in its audit library file and resumes normal service with that slave station 14. Should the access security test fail, the access security discriminator 10 repeats the down-line loading process one more time. Should the second attempt fail, the access security discriminator ceases the test process and records this event in the audit library file for further investigation.

Also, via the access security discriminator 10, a supervisor, generally a security manager, can test the system, poll and test the slave stations, enter in, remove or change slave station identifications, update library files, do audit and statistical reports, perform down-line loads, perform maintenance checks, set time limit parameters used in the methods described above, etc. To protect security of the system both mechanically and administratively, the supervisor must use a key to turn on a supervisory port in the access security discriminator 10, and then must enter a correct identification number and supervisory password. Alarms may also be sent to the security supervisor, or any other location, when the audit reports indicate an attempt to breach security.

From the description above, it will be apparent that a stolen slave station when connected to the telephone lines at an unauthorized station, will have lost its stored software data and be unable to respond to requests for identification from the access security discriminator 10. Also, because the discriminator 10 attempts reconnection to the original location, no connection will be made to a relocated slave station even if it were able to provide the proper identification number and user password.

This security accessing system operates without any indication of its presence or operation to the requesting user.

It will thus be seen that the objects set forth above, are efficiently attained, and since certain changes may be made in carrying out the above process without departing from the scope of the invention, it is intended that all matter contained in the above description shall be interpreted as illustrative and not in a limiting sense.

What is claimed:

1. A process for limiting access to an information source to authorized devices, said devices having a remote terminal with stored identification data, comprising the steps of:
   establishing a communication link between an access discriminator associated with said information source and an access requester device, said communication link being initiated by said requester;
   generating at said access discriminator a random number each time one said communication link is established;
   encrypting said random number;
   transmitting said encrypted random number to said access requester via said communication link;
   decrypting said encrypted random number at said remote terminal to extract said random number at said access requester;
   encrypting said access requester's identification data using said random number as an encryption key;
   transmitting said encrypted identification data via said communication link to said access discriminator;
   decrypting said encrypted identification data using said random number as the key to extract said identification data at said access discriminator;
   comparing said decrypted identification data with units of identification data available to said access discriminator from storage; and
   connecting said access requester to said information source if said decrypted identification data matches one of said units of identification data.

2. A process as claimed in claim 1, and further comprising the step of disconnecting said communication link by said discriminator when said comparison of identification data does not result in a match.

3. A process as claimed in claim 1, and further comprising the step of disconnecting said communication link by said discriminator when a response to said encrypted random number is not received at said discriminator within a prescribed time period.

4. A process as claimed in claim 1, and further comprising the step of interposing said access discriminator and access requester device between a computer network and a user terminal.

5. A process as claimed in claim 1, wherein said remote terminal stores software for decryption and encryption, said software being in volatile memory, loss of electrical power to said remote terminal wiping out said stored software.

* * * * *